United States Patent
Ait-Haddou et al.

(10) Patent No.: US 9,394,407 B2
(45) Date of Patent: *Jul. 19, 2016

(54) HYDROPHILIC BLOCK COPOLYMERS AND MEMBRANES PREPARED THEREFROM (I)

(71) Applicant: PALL CORPORATION, Port Washington, NY (US)

(72) Inventors: Hassan Ait-Haddou, Melville, NY (US); Frank Onyemauwa, Pace, FL (US)

(73) Assignee: Pall Corporation, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,343

(22) Filed: Jun. 30, 2014

(65) Prior Publication Data

US 2015/0376340 A1 Dec. 31, 2015

(51) Int. Cl.

| | |
|---|---|
| C08G 75/20 | (2006.01) |
| C08G 75/23 | (2006.01) |
| B01D 67/00 | (2006.01) |
| B01D 71/38 | (2006.01) |
| B01D 71/46 | (2006.01) |
| B01D 71/68 | (2006.01) |
| B01D 71/80 | (2006.01) |
| B01D 71/52 | (2006.01) |
| C08G 64/18 | (2006.01) |
| C08G 65/22 | (2006.01) |
| C08G 65/26 | (2006.01) |
| C08L 81/06 | (2006.01) |
| B01D 71/56 | (2006.01) |
| B01D 71/64 | (2006.01) |

(52) U.S. Cl.
CPC ............ *C08G 75/23* (2013.01); *B01D 67/0009* (2013.01); *B01D 67/0013* (2013.01); *B01D 71/38* (2013.01); *B01D 71/46* (2013.01); *B01D 71/52* (2013.01); *B01D 71/56* (2013.01); *B01D 71/64* (2013.01); *B01D 71/68* (2013.01); *B01D 71/80* (2013.01); *C08G 64/183* (2013.01); *C08G 65/22* (2013.01); *C08G 65/2612* (2013.01); *C08G 65/2627* (2013.01); *C08L 81/06* (2013.01); *B01D 2323/12* (2013.01); *B01D 2325/36* (2013.01); *B01D 2325/38* (2013.01); *C08G 2650/24* (2013.01); *C08G 2650/30* (2013.01)

(58) Field of Classification Search
CPC .... C08F 293/00; C08F 295/00; C08L 87/005; C08G 64/18; C08G 64/183; C08G 10/06; C08G 75/0245; C08G 75/23; C08J 9/34
See application file for complete search history.

(56) References Cited

U.S. PATENT DOCUMENTS

| | | |
|---|---|---|
| 3,318,959 A | 5/1967 | Borman |
| 3,470,258 A | 9/1969 | Tesoro |
| 3,498,959 A | 3/1970 | Brode |
| 3,625,977 A | 12/1971 | Hamb |
| 3,847,867 A | 11/1974 | Heath et al. |
| 4,242,384 A | 12/1980 | Andrew et al. |
| 4,435,330 A | 3/1984 | Falk |
| 4,485,211 A | 11/1984 | Okamoto |
| 4,611,048 A | 9/1986 | Peters |
| 4,698,388 A | 10/1987 | Ohmura et al. |
| 4,725,441 A | 2/1988 | Porter et al. |
| 4,948,508 A | 8/1990 | Nakagawa et al. |
| 4,954,256 A | 9/1990 | Degen et al. |
| 5,082,565 A | 1/1992 | Haubs et al. |
| 5,191,026 A | 3/1993 | Nishi et al. |
| 5,198,554 A | 3/1993 | Inagaki et al. |
| 5,202,388 A | 4/1993 | Iio et al. |
| 5,282,965 A | 2/1994 | Urairi et al. |
| 5,286,382 A | 2/1994 | Scarmoutzos et al. |
| 5,462,867 A | 10/1995 | Azad et al. |
| 5,580,934 A | 12/1996 | Nishi et al. |
| 5,599,882 A | 2/1997 | Nishi et al. |
| 5,726,230 A | 3/1998 | Murata et al. |
| 5,824,049 A | 10/1998 | Ragheb et al. |
| 5,911,880 A | 6/1999 | Klein et al. |
| 5,969,170 A | 10/1999 | Grubbs et al. |
| 5,976,380 A | 11/1999 | Moya |
| 5,998,326 A | 12/1999 | Hafner et al. |
| 6,039,872 A | 3/2000 | Wu et al. |
| 6,096,020 A | 8/2000 | Hofmann |
| 6,111,121 A | 8/2000 | Grubbs et al. |

(Continued)

FOREIGN PATENT DOCUMENTS

| | | |
|---|---|---|
| CN | 1416944 A | 5/2003 |
| CN | 103087306 A | 5/2013 |

(Continued)

OTHER PUBLICATIONS

Liu, C. et al Journal of Polymer Science Part A: Polymer Chemistry vol. 46 pp. 6754-6761 (Oct. 2008).*

Barriau, E. et al Macromolecular Rapid Communications vol. 26 pp. 862-867 (May 2005).*

Liu, C. et al. Journal of Applied Polymer Science vol. 108 pp. 777-784 (Apr. 2008).*

(Continued)

*Primary Examiner* — Irina S Zemel
*Assistant Examiner* — Jeffrey Lenihan
(74) *Attorney, Agent, or Firm* — Leydig, Voit & Mayer, Ltd.

(57) ABSTRACT

Disclosed are block copolymers of the formula A-B-A (I) or A-B (II), comprising blocks A and B, wherein block A is a hydrophilic polymeric segment comprising polyglycerol and block B is an aromatic hydrophobic polymeric segment. The block copolymers find use as wetting agents in the preparation of porous membranes from aromatic hydrophobic polymers such as polyethersulfone.

20 Claims, 3 Drawing Sheets

(56) References Cited

U.S. PATENT DOCUMENTS

| | | | |
|---|---|---|---|
| 6,126,825 A | 10/2000 | Shinagawa et al. |
| 6,258,272 B1 | 7/2001 | Wang et al. |
| 6,354,443 B1 | 3/2002 | Moya |
| 6,420,503 B1 | 7/2002 | Jayaraman et al. |
| 6,669,980 B2 | 12/2003 | Hansen |
| 6,734,386 B1 | 5/2004 | Lauterbach et al. |
| 6,759,537 B2 | 7/2004 | Grubbs et al. |
| 6,846,890 B2 | 1/2005 | Miyaki et al. |
| 6,867,303 B2 | 3/2005 | Grela |
| 6,921,735 B2 | 7/2005 | Hoveyda et al. |
| 7,037,993 B2 | 5/2006 | Taguchi et al. |
| 7,230,066 B2 | 6/2007 | Khouri et al. |
| 7,284,668 B2 | 10/2007 | Charkoudian |
| 7,300,022 B2 | 11/2007 | Muller |
| 7,329,758 B1 | 2/2008 | Grubbs et al. |
| 7,378,528 B2 | 5/2008 | Herrmann et al. |
| 7,423,070 B2 | 9/2008 | Larsson et al. |
| 7,611,629 B2 | 11/2009 | Doucoure et al. |
| 7,628,917 B2 | 12/2009 | Penezina et al. |
| 7,717,273 B2 | 5/2010 | Kozlov et al. |
| 7,750,103 B2 | 7/2010 | Emrick et al. |
| 8,048,963 B2 | 11/2011 | Fuller et al. |
| 8,049,025 B2 | 11/2011 | Zhan |
| 8,053,531 B2 | 11/2011 | Hirata et al. |
| 8,232,360 B2 | 7/2012 | Sampson et al. |
| 8,277,914 B2 | 10/2012 | Ogawa et al. |
| 8,283,410 B2 | 10/2012 | Musa |
| 8,329,927 B2 | 12/2012 | Tew et al. |
| 8,420,704 B2 | 4/2013 | Hillmyer et al. |
| 8,440,765 B2 | 5/2013 | Balsara et al. |
| 8,535,590 B2 | 9/2013 | Milner et al. |
| 8,647,730 B2 | 2/2014 | Kudo et al. |
| 2001/0021764 A1 | 9/2001 | Weisse et al. |
| 2004/0219350 A1 | 11/2004 | Brown et al. |
| 2005/0154199 A1 | 7/2005 | Whiteford et al. |
| 2005/0176893 A1 | 8/2005 | Rana et al. |
| 2005/0222279 A1 | 10/2005 | Larsson et al. |
| 2007/0075013 A1 | 4/2007 | Duong et al. |
| 2007/0238853 A1 | 10/2007 | Hay et al. |
| 2008/0000201 A1 | 1/2008 | Schorzman et al. |
| 2009/0127186 A1 | 5/2009 | Mizomoto et al. |
| 2009/0127197 A1 | 5/2009 | Liu et al. |
| 2009/0173694 A1 | 7/2009 | Peinemann et al. |
| 2009/0200239 A1 | 8/2009 | Axen et al. |
| 2010/0137180 A1* | 6/2010 | Maessen ............ B41N 3/06 510/171 |
| 2010/0230351 A1 | 9/2010 | Hoving et al. |
| 2011/0120937 A1 | 5/2011 | Ishizuka et al. |
| 2011/0201756 A1 | 8/2011 | Jo et al. |
| 2011/0206880 A1 | 8/2011 | Wang et al. |
| 2011/0207841 A1 | 8/2011 | Kosar et al. |
| 2011/0240550 A1 | 10/2011 | Moore et al. |
| 2012/0077893 A1 | 3/2012 | Hood |
| 2012/0172537 A1 | 7/2012 | Arai et al. |
| 2013/0041055 A1 | 2/2013 | Hillmyer et al. |
| 2013/0108845 A1 | 5/2013 | Tee |
| 2013/0165661 A1 | 6/2013 | Grubbs et al. |
| 2013/0280237 A1 | 10/2013 | Tew et al. |
| 2015/0247006 A1* | 9/2015 | Klein ............. C08G 81/00 525/50 |

FOREIGN PATENT DOCUMENTS

| | | |
|---|---|---|
| DE | 3936997 A1 | 5/1991 |
| EP | 0103297 A2 | 3/1984 |
| EP | 0199564 A2 | 10/1985 |
| EP | 0 298 408 A1 | 1/1989 |
| EP | 0 409 291 A2 | 1/1991 |
| EP | 0 430 585 A2 | 6/1991 |
| EP | 0677504 A1 | 10/1995 |
| EP | 0 713 893 A1 | 5/1996 |
| EP | 0 784 066 A1 | 7/1997 |
| EP | 0 811 420 A1 | 12/1997 |
| EP | 1 238 996 A1 | 9/2002 |
| EP | 1 408 064 A1 | 4/2004 |
| EP | 1621573 A1 | 2/2006 |
| EP | 1 769 841 A1 | 4/2007 |
| EP | 1 903 074 A1 | 3/2008 |
| EP | 2 687 285 A1 | 1/2014 |
| JP | S61-204008 A | 9/1986 |
| JP | 2011-122124 A | 6/2011 |
| KR | 2014-0060440 A | 5/2014 |
| WO | 97/22406 A1 | 6/1997 |
| WO | 98/025758 A1 | 6/1998 |
| WO | 00/11058 A1 | 3/2000 |
| WO | 00/50161 A1 | 8/2000 |
| WO | WO 01/61042 A2 | 8/2001 |
| WO | WO 02/072659 A1 | 9/2002 |
| WO | WO 2007/018426 A1 | 2/2007 |
| WO | WO 2013/097570 A1 | 12/2007 |
| WO | 2008/095709 A1 | 8/2008 |
| WO | WO 2009/001724 A1 | 12/2008 |
| WO | WO 2009/013340 A1 | 1/2009 |
| WO | 2011/146669 A1 | 11/2011 |
| WO | 2012/083253 A1 | 6/2012 |
| WO | 2013/162449 A1 | 10/2013 |

OTHER PUBLICATIONS

Adams, Marisa et al., "Investigation of microphase separated dicarboximide-functionalized oxanorbornyl diblock copolymers exhibiting nanostructure," Abstracts of Papers, 247th ACS National Meeting & Exposition, Dallas, TX, United States, Mar. 16-20, 2014.

Asif, A. et al., "Hydroxyl terminated poly(ether ether ketone) with pendant methyl group-toughened epoxy clay ternary nanocomposites: Preparation, morphology, and thermomechanical properties," Journal of Applied Polymer Science, vol. 106, No. 5, 2936-2946 (Dec. 5, 2007) (Abstract).

Bang, Joona et al., "Defect-Free Nanoporous Thin Films from ABC Triblock Copolymers," Journal of the American Chemical Society, vol. 128, pp. 7622-7629 2006).

"Spin Coat Theory," Brewer Science, Inc., http://www.brewerscience.com/research/processing-theory/spin-coating-theory, downloaded Jun. 30, 2014 (no original publication date available).

Francis, Bejoy et al., "Synthesis of hydroxyl-terminated poiy(ether ether ketone) with pendent tert-butyl groups and its use as a toughener for epoxy resins," Journal of Polymer Science Part B: Polymer Physics, vol. 44, No. 3, pp. 541-556 (Feb. 1, 2006) (Abstract).

Girotto, Claudio et al., "Spray coating for fabricating polymer-based organic solar cells," Global Solar Technology, pp. 10-13 (Mar. 2010).

Guillen, Gregory R. et al., "Preparation and Characterization of Membranes Formed by Nonsolvent Induced Phase Separation: A Review," Industrial & Engineering Chemistry Research, vol. 50, pp. 3798-3817 (2011).

Hahn et al., "Structure Formation of Integral-Asymmetric Membrane of Polystyrene-block-Pol (ethylene oxide) ," J. Polym. Sci. B Polym. Phys., 51: 281-290 (2013).

Hall, David B. et al., "Spin Coating of Thin and Ultrathin Polymer Films," Polymer Engineering and Science, vol. 38, No. 12, pp. 2039-2045 (Dec. 1998).

Hollister, Adrienne et al., "Synthesis and physical properties of dicarboximide-functionalized oxanorbornyl polymers," Abstracts of Papers, 241st ACS National Meeting & Exposition, Anaheim, CA, United States, Mar. 27-31, 2011.

Hollister, Adrienne et al., "Towards novel thin-film polymer blends: Synthesis and characterization of norbornene related homopolymers and diblock copolymers via ring opening metathesis polymerization," Abstracts of Papers, 239th ACS National Meetin , San Francisco, CA, United States, Mar. 21-25, 2010.

Ledoux, Nele, "Ruthenium Olefin Metathesis Catalysts: Tuning of the Ligand Environment," Universiteit Gent, pp. 1-198 (2007).

Li, Li, "Nanoporous Polymers for Membrane Applications," Ph.D. Thesis, DTU Chemical Engineering, pp. 1-180 (Jan. 2012).

Love, Jennifer A. et al., "A Practical and Highly Active Ruthenium-Based Catalyst that Effects the Cross Metathesis of Acrylonitrile," Angewandte Chemie, vol. 41, No. 21, pp. 4035-4037 (2002).

(56) References Cited

OTHER PUBLICATIONS

Lu, Hua et al., "One-Pot Synthesis of Brush-Like Polymers via Integrated Ring-Opening Metathesis Polymerization and Polymerization of Amino Acid N-Carboxyanhydrides," *Journal of the American Chemical Society*, vol. 131, pp. 13582-13583 (2009).

Mulder, M., "Phase Inversion Membranes," *Membrane Preparation: Phase Inversion Membranes*, pp. 3331-3346 (2000).

Oss-Ronen, Liat et al., "Characterization of Block Copolymer Self-Assembly: From Solution to Nanoporous Membranes," *Macromolecules*, vol. 45, pp. 9631-9642 (2012).

Park, Miri et al., "Block Copolymer Lithography: Periodic Arrays of ~$10^{11}$ Holes in 1 Square Centimeter," *Science*, vol. 276, pp. 1401-1404 (May 30, 1997).

Peinemann, Klaus-Viktor et al., "Asymmetric superstructure formed in a block copolymer via phase separation," *Nature Materials*, vol. 6, pp. 992-996 (Dec. 2007).

Posselt, Kyle et al., "Synthesis and characterization of dicarboximide-functionalized oxanorbornyl homopolymer and diblock copolymers," Abstracts of Papers, 243rd ACS National Meeting & Exposition, San Diego, CA, United States, Mar. 25-29, 2012.

Richmond, Victoria et al., "Synthesis and characterization of dicarboximide-functionalized oxanorbornyl homopolymers with ethylene oxide side chains," Abstracts of Papers, 247th ACS National Meeting & Exposition, Dallas, TX, United States, Mar. 16-20, 2014.

Riffle, J.S. et al., "Synthesis of hydroxyl-terminated polycarbonates of controlled number—average molecular weight," *Journal of Polymer Science: Polymer Chemistry Edition*, vol. 20, No. 8, pp. 2289-2301 (Aug. 1982) (Abstract).

Sahu, Niranjan et al., "Fundamental understanding and modeling of spin coating process: A review," *Indian Journal of Physics*, vol. 83, No. 4, pp. 493-502 (2009).

Sommer, William, "Olefin Metathesis," Sigma-Aldrich Chemical Co., Inc., *ChemFiles*, vol. 9, No. 6, pp. 3-11 (2009).

Srinivasan, Siddarth et al., "Solution Spraying of Poly(methyl methacrylate) Blends to Fabricate Micro-textured, Superoleophobic Surfaces," Manuscript (downloaded May 19, 2014).

Thurn-Albrecht, Thomas et al.,"Nanoscopic Templates from Oriented Block Copolymer Films," *Advanced Materials*, vol. 12, No. 11, pp. 787-791 (2000).

Walheim, Stefan et al, "Structure Formation via Polymer Demixing in Spin-Cast Films," *Macromolecules*. vol. 30, pp. 4995-5003 (1997).

"Polyester ether ketone (PEEK)," Wikipedia, http://en.wikipedia.org/wiki/PEEK, downloaded Jun. 11, 2014.

Yang, Yong-qiang et al., "Preparation of PPESK Hollow Fiber Asymmetric Nanofiltration Membrane," *The Proceedings of the 3rd International Conference on Functional Molecules*, pp. 295-296 (May/Jun. 2011).

Yun, Yanbin et al, "Preparation of a Ultrafiltration Membrane from Poly(Phthalazine Ether Sulfone Ketone)," *Integrated Concepts in Water Recycling*, pp. 741-752 (2005).

Zhang Yanfeng et al., PEG-Polypeptide Dual Brush Block Copolymers Synthesis and Appllcation in Nanoparticle Surface PEGylation *ACS Macro Letters*, vol. 2 pp. 809-813 (2013).

Killops et al., "Nanopatterning Biomolecules by Block Copolymer Self-Assembly," *MacroLetters*, vol. 1, pp. 758-763 (2012).

Kuhlmann et al., *Macromol. Rapid Commun.*, vol. 33, pp. 1482-1486 (2012).

European Patent Office, Extended European Search Report in European Patent Application No. 15173202.1 (Oct. 30, 2015).

Duncanson et al., "Microfluidic synthesis of monodisperse porous microsphers with size-tunable pores," *Soft Matter*, vol. 8, pp. 10636-10640 (2012).

Karger-Kocsis et al., "Synthesis of reactive hyperbranched and star-like polyethers and their use for toughening of vinylester-urethane hybrid resins," *Polymer*, vol. 45, pp. 1185-1195 (2004).

Schull et al., "One-step synthesis of multi-alkyne functional hyperbranched polyglycerols by copolymerization of glycidyl propargyl ether and glycidol," *Polymer Chemistry*, vol. 4, pp. 4730-4736 (2013).

Sunder et al., "Copolymers of Glycidol and Glycidyl Ethers: Design of Branched Polyether Polyols by Combination of Latent Cyclic $AB_2$ and ABR Monomers," *Macromolecules*, vol. 33, No. 21, pp. 7682-7692 (2000).

Intellectual Property Office of Singapore, Search Report in Singapore Patent Application No. 10201504716U (Oct. 8, 2015).

\* cited by examiner

HYDROPHILIC BLOCK COPOLYMERS AND MEMBRANES PREPARED THEREFROM (I)

BACKGROUND OF THE INVENTION

Aromatic hydrophobic polymers such as polysulfone, polyethersulfone, poly(phthalazine ether sulfone ketone), poly(p-phenylene sulfide), polyether imide, polyimide, polyphenylene oxide, polyphenylene ether, and polyether ether ketone are useful for preparing porous membranes due to their chemical stability, processability, mechanical strength, flexibility, and thermal stability. Since these polymers are generally hydrophobic, membranes prepared from these polymers are hydrophobic, and thus lack desirable surface properties such as wettability, low protein adsorption, thromboresistance, and controlled surface chemical reactivity.

Attempts have been made to improve one or more of the surface properties of membranes made from aromatic hydrophobic polymers. For example, membranes have been treated with high energy radiation or plasma to impart hydrophilicity. In other examples, hydrophilic monomers have been grafted to hydrophobic membrane surfaces. Attempts also have been made to coat the hydrophobic membrane with water soluble polymers such as polyethylene glycol or polyvinyl pyrrolidone. The above attempts for improving properties, particularly hydrophilicity, however, have one or more drawbacks such as lack of reproducibility, lack of stability of the modification, and/or pore clogging.

The foregoing shows that there is an unmet need for hydrophilic membranes formed from aromatic hydrophobic polymers and for a method of imparting hydrophilicity to membranes formed from aromatic hydrophobic polymers.

BRIEF SUMMARY OF THE INVENTION

The invention provides a block copolymer comprising hydrophilic segments which are useful in the preparation of hydrophilic membranes from aromatic hydrophobic polymers. Thus, the present invention provides a block copolymer of formula A-B-A (I) or A-B (II), comprising blocks A and B, wherein block A is a hydrophilic polymeric segment comprising polyglycerol and block B is an aromatic hydrophobic polymeric segment.

The present invention also provides a method of preparing a block copolymer comprising: (i) providing an aromatic hydrophobic polymeric segment having one or more terminal functional groups; and (ii) carrying out ring opening polymerization of glycidol on the aromatic hydrophobic polymeric segment in the presence of a base.

The present invention also provides hydrophilic porous membranes comprising an aromatic hydrophobic polymer and a block copolymer as described above, and a method of preparing such porous membranes.

The present invention has one or more of the following advantages. It provides for a facile method for tuning the degree of hydrophilicity desired in a porous membrane. Block copolymers of various degrees of hydrophilicity are produced from aromatic hydrophobic polymers. The composition of the block copolymers is readily characterized by well known techniques. The porous membranes prepared using the block copolymers are low in extractables. The block copolymers have strong adhesion to aromatic hydrophobic polymers. The porous membranes are stable to process conditions such as autoclaving, steaming, and isopropanol (IPA) extraction.

BRIEF DESCRIPTION OF THE SEVERAL VIEWS OF THE DRAWING(S)

DETAILED DESCRIPTION OF THE INVENTION

Figure 1A:
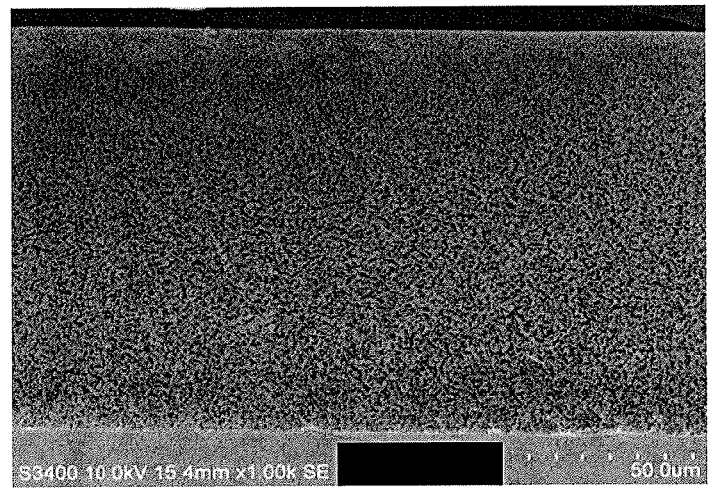
FIG. 1A depicts the SEM of a cross-section of a porous membrane prepared from the block copolymer in accordance with an embodiment of the invention.

In accordance with an embodiment, the invention provides a block copolymer of formula A-B-A (I) or A-B (II), comprising blocks A and B, wherein block A is a hydrophilic polymeric segment comprising polyglycerol (also known as polyglycidol) and block B is an aromatic hydrophobic polymeric segment. Porous membranes comprising a block copolymer of the invention and an aromatic hydrophobic polymer are hydrophilic.

In accordance with an embodiment, the polyglycerol has one or more of the following repeat units:

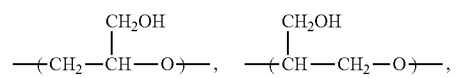,

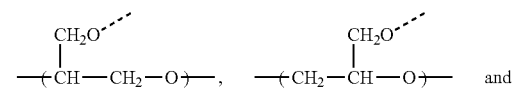 and

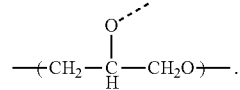.

In an embodiment, block A comprises of one or more of the following structures:

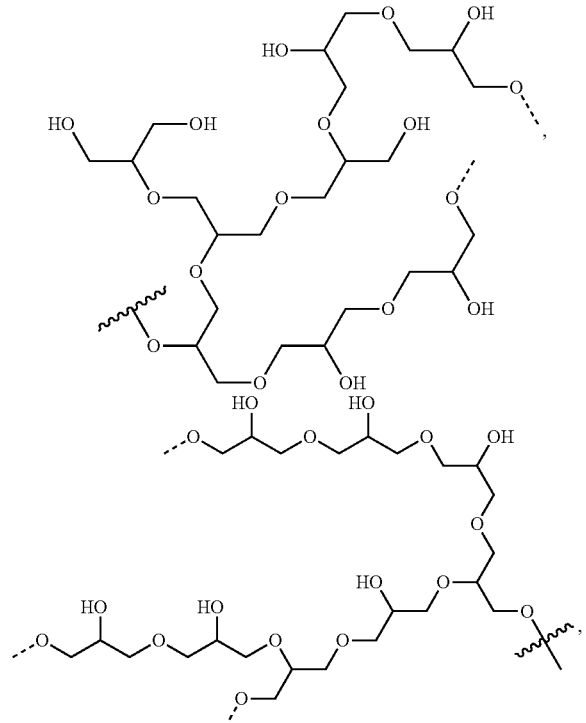

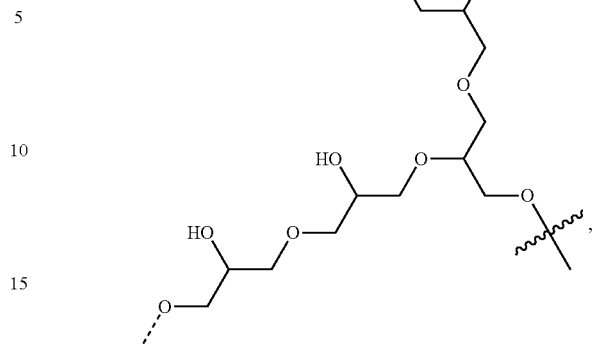

In accordance with an embodiment, the aromatic hydrophobic polymeric segment of the block copolymer is selected from polysulfone, polyethersulfone, polyphenylene ether, polyphenylene oxide, polycarbonate, poly(phthalazinone ether sulfone ketone), polyether ketone, polyether ether ketone, polyether ketone ketone, polyimide, polyetherimide, and polyamide-imide, preferably polyethersulfone.

Embodiments of the aromatic hydrophobic polymer segments include polysulfone (PS), polyethersulfone (PES), polycarbonate (PC), polyether ether ketone (PEEK), poly (phthalazinone ether sulfone ketone) (PPESK), polyphenylene sulfide (PPS), polyphenylene ether (PPE), polyphenylene oxide (PPO), and polyether-imide (PEI), which have the following structures:

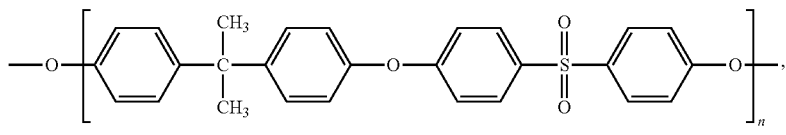
PS

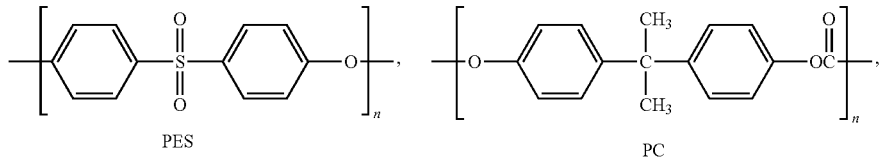
PES    PC

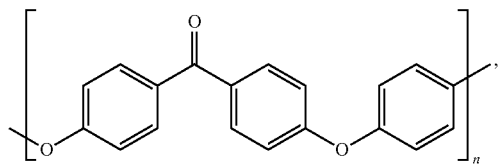
PEEK

-continued

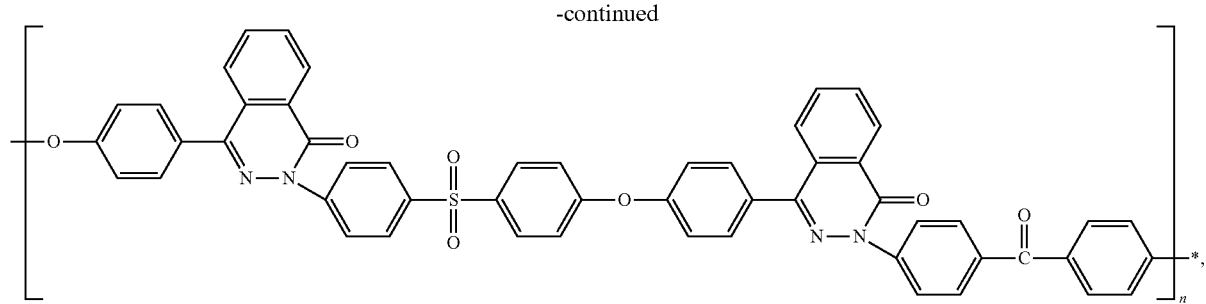

PPESK

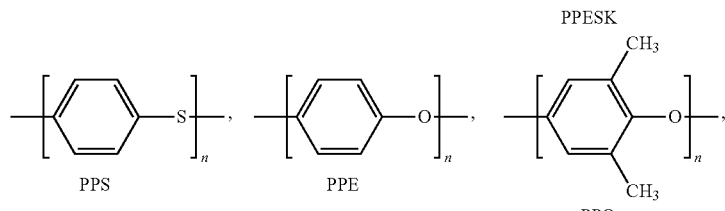

PPS   PPE   PPO

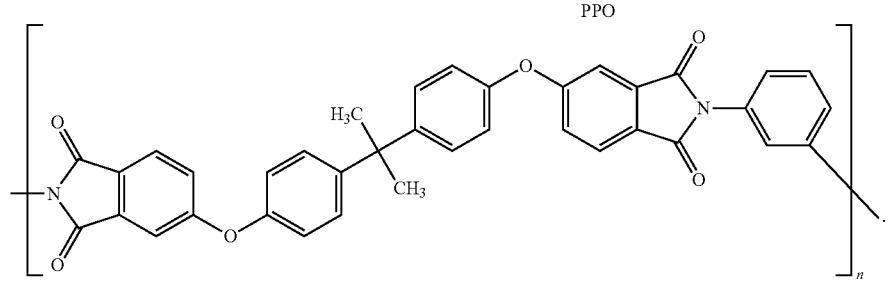

PEI

The number of repeat units, n, within each of the above aromatic hydrophobic segment can be from about 10 to about 1000, preferably from about 30 to about 300, and more preferably from about 50 to about 250.

In accordance with an embodiment, the block copolymer of the invention, where polyethersulfone is the aromatic hydrophobic segment, has the following structure:

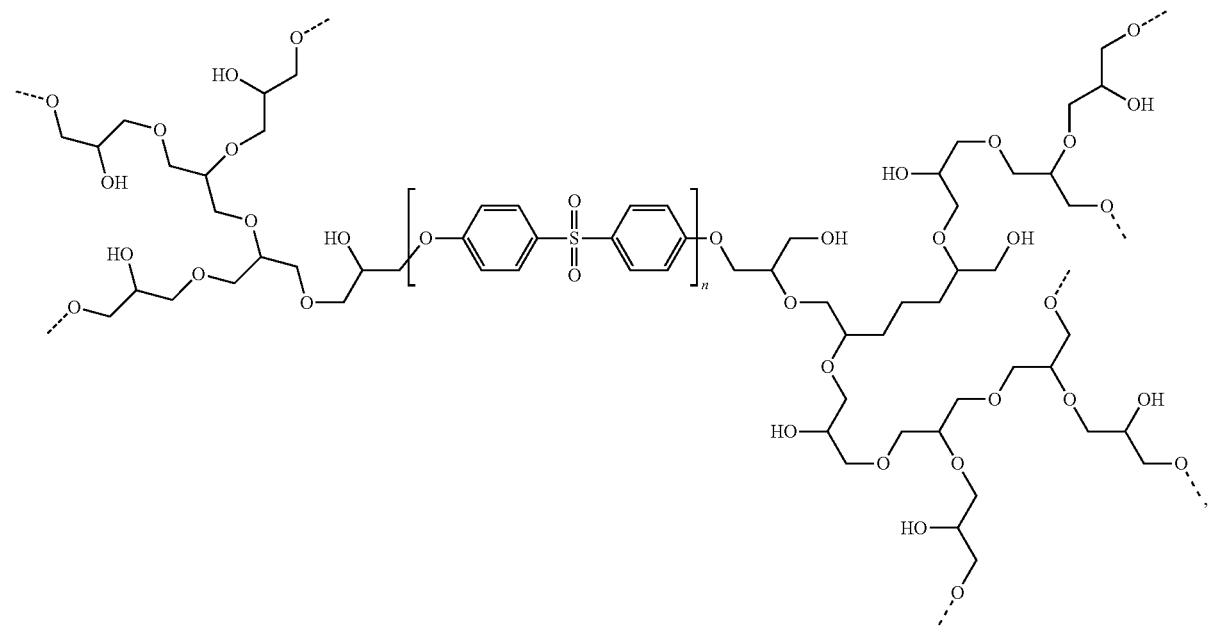

wherein n is about 10 to about 1000, preferably about 50 to 175, and more preferably about 60 to about 100.

Where polysulfone is the aromatic hydrophobic polymer segment, n is about 10 to about 1000, preferably about 30 to about 225, and more preferably about 45 to about 130.

In accordance with an embodiment, block A is present in the copolymer in an amount of about 20% to about 60 mol % and block B is present in an amount of about 30% to about 80 mol %. Preferably, block A is present in an amount of about 40% to about 55 mol % and block B is present in an amount of about 40% to about 60 mol %.

In accordance with an embodiment, the invention also provides a method of preparing the above block copolymer, the method comprising:

(i) providing an aromatic hydrophobic polymeric segment having one or more terminal functional groups selected from hydroxy, mercapto, and amino groups; and (ii) carrying out ring opening polymerization of glycidol on the aromatic hydrophobic polymeric segment.

In accordance with an embodiment, the aromatic hydrophobic polymeric segment is selected from polysulfone, polyethersulfone, polyphenylene ether, polyphenylene oxide, polycarbonate, poly(phthalazinone ether sulfone ketone), polyether ketone, polyether ether ketone, polyether ketone ketone, polyimide, polyetherimide, and polyamide-imide, preferably polyethersulfone. The aromatic hydrophobic polymeric segment comprises one or more, preferably one or two, terminal functional groups selected from hydroxy, mercapto, or amino groups.

The functional groups can be provided on the aromatic hydrophobic segments by methods known to those skilled in the art. For example, hydroxy-terminated polyether imide synthesis is described in U.S. Pat. Nos. 4,611,048 and 7,230,066. Thus, for example, hydroxy-terminated polyether imides can be prepared by the reaction of a bis-ether anhydride and a diamine, followed by reaction with an amino alcohol. Illustratively, a hydroxy-terminated polyether imide can be prepared by the reaction of bis(4-(3,4-dicarboxy-phenoxy)phenyl)propane dianhydride and m-phenylenediamine, followed by reaction with p-aminophenol.

Amine-terminated polyether imides can be prepared by the reaction of a bis-ether anhydride and a diamine. Thus, for example, bis(4-(3,4-dicarboxy-phenoxy)phenyl)propane dianhydride and m-phenylenediamine can be reacted to produce an amine terminated polyether imide. See, for example, U.S. Pat. No. 3,847,867.

Hydroxy-terminated PEEK is described in *Journal of Polymer Science Part B* 2006, 44, 541 and *Journal of Applied Science* 2007, 106, 2936. Thus, for example, hydroxy-terminated PEEK with pendent tert-butyl groups can be prepared by the nucleophilic substitution reaction of 4,4'-difluorobenzophenone with tert-butyl hydroquinone with potassium carbonate as catalyst.

Hydroxy-terminated polycarbonate is described in *Journal of Polymer Science: Polymer Chemistry Edition* 1982, 20, 2289. Thus, for example, hydroxy-terminated polycarbonate can be prepared by the reaction of bisphenol A and phosgene, with in situ blocking of some of the phenolic groups either prior to or during phosgenation. Trimethylchlorosilane, trifluoroacetic anhydride, or trifluoroacetic acid can be used for the blocking. The blocking group can be removed at the end of the polymerization.

Hydroxy-terminated PPO can be prepared as described in U.S. Pat. No. 3,318,959. Thus, for example, poly-2,6-dimethylphenylene ether can be reacted with sodium hydroxide to obtain a PPO having a hydroxyl content of 2.3 to 3 hydroxyl groups per molecule.

In an embodiment, the aromatic hydrophobic polymeric segment having one or more hydroxy groups is of the formula:

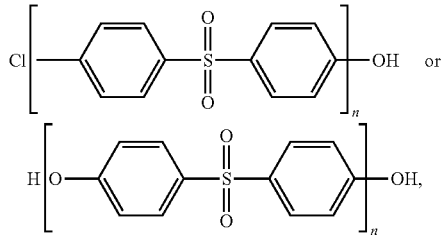

wherein n is about 10 to about 1000, preferably about 50 to 175, and more preferably about 60 to about 100.

Polyethersulfone is commercially available, for example, as VIRANTAGE VW-10700 from Solvay, with the formula

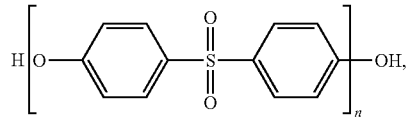

which has a GPC molecular weight 21000 g/mol and OH end groups of 210 µeq/g;

as VIRANTAGE VW-10200 from Solvay with the formula

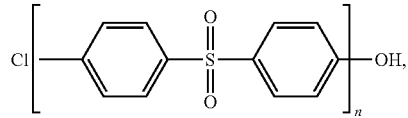

which has a GPC molecular weight of 44,200 g/mol and OH end groups of 80 µeq/g; and as SUMIKAEXCEL™ 5003PS from Sumitomo with the formula

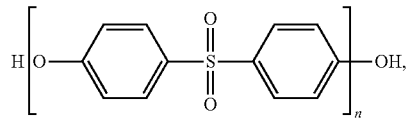

which has a reduced viscosity of 0.50 [1% PES dissolved in DMF] and OH end groups in the range of 0.6-1.4 per molecule.

Glycidol or 2,3-epoxy-1-propanol contains one epoxide ring and one hydroxyl group as functional end groups. Both functional end groups are capable of reacting with each other to form macromolecules which are glycerol derivatives. The resulting macromolecules continue to react to form polyglycerol. The opening of the epoxide ring of glycidol is initiated by the nucleophile, i.e., oxide anion, amino group, or sulfide anion, of the aromatic hydrophobic polymeric segment, which is present as the terminal functional group (amino group) or is produced by the reaction of the terminal group (OH or SH) on the aromatic hydrophobic polymeric segment with the base employed in the reaction. In an embodiment, when SH acts as a nucleophile, the use of a base is optional. When an amino group is the nucleophile, then a base is not required.

Any suitable base can be employed, for example, a base selected from potassium carbonate, sodium carbonate, cesium carbonate, sodium tertiary butoxide, potassium tertiary butoxide, tetramethylammonium hydroxide, ammonium hydroxide, tetrabutylammonium hydroxide, sodium hydroxide, potassium hydroxide, lithium hydroxide, barium carbonate, barium hydroxide, cesium hydroxide, lithium carbonate, magnesium carbonate, magnesium hydroxide, sodium amide, and lithium amide, and combinations thereof.

In accordance with an embodiment, the ring opening polymerization can be carried in a suitable solvent, particularly a polar aprotic solvent. Examples of suitable solvents include N, N-dimethylacetamide, N, N-dimethylformamide, dimethyl sulfoxide, and N-methylpyrrolidone, and mixtures thereof.

The amount of aromatic hydrophobic polymer or glycidol can be present in the polymerization medium at any suitable concentration, for example, from a concentration of about 5% to about 60% or more, preferably about 10% to about 50%, and more preferably about 20% to about 40%, by weight. In an embodiment, the concentration is about 30% by weight.

The ring opening polymerization is conducted such that the ratio of the hydrophobic polymeric segment to glycidol in the reaction mixture is preferably about 1:0.1 to about 1:1.1, more preferably about 1:0.7 to about 1:0.9, and even more preferably about 1:0.8.

The ring opening polymerization is conducted at a suitable temperature, for example, from 25° C. to about 120° C., preferably about 50° C. to about 110° C., and more preferably about 90° C. to 100° C.

The polymerization can be carried out for any suitable length of time, for example, about 1 hr to about 100 hrs or more, preferably about 2 hrs to about 20 hrs, more preferably about 3 hrs to about 10 hrs. The polymerization time can vary depending on, among others, the degree of polymerization desired and the temperature of the reaction mixture.

The polymerization can be stopped by quenching the reaction mixture with an acid. The block copolymer can be isolated from the reaction mixture by precipitation with a nonsolvent, e.g., isopropanol or water. The resulting polymer is dried to remove any residual solvent or nonsolvent.

The block copolymer can be characterized by any suitable analytical technique. For example, the amount of hydrophobic polymeric segment and the amount of the glycidol block (polyglycerol) can be determined by proton NMR spectroscopy.

The present invention further provides a porous membrane comprising an aromatic hydrophobic polymer and a block copolymer as described above. The present invention further provides a method of preparing a porous membrane comprising an aromatic hydrophobic polymer and a block copolymer, the method comprising:

(i) providing a polymer solution comprising a solvent, said aromatic hydrophobic polymer, and said block copolymer;

(ii) casting the polymer solution as a thin film;

(iii) subjecting the thin film to phase inversion to obtain a porous membrane; and optionally (iv) washing the porous membrane.

The polymer solution for preparing a membrane contains a polymer and a block copolymer as a wetting agent. Typical polymer solutions comprise at least one solvent, and may further comprise at least one nonsolvent. Suitable solvents include, for example, N,N-dimethylformamide (DMF); N,N-dimethylacetamide (DMAC); N-methyl pyrrolidone (NMP); dimethyl sulfoxide (DMSO), methyl sulfoxide, tetramethylurea; dioxane; diethyl succinate; chloroform; and tetrachloroethane; and mixtures thereof. Suitable nonsolvents include, for example, water; various polyethylene glycols (PEGs; e.g., PEG-200, PEG-300, PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; acids, such as acetic acid, citric acid, and lactic acid; and various salts, such as calcium chloride, magnesium chloride, and lithium chloride; and mixtures thereof.

Typical casting solutions contain the polymer in the range of about 10 wt % to about 35 wt % resin, in the range of from about 0.1 to about 10 wt %, preferably about 0.2% to about 2%, and more preferably about 0.3% to about 1% of the hydrophilic block copolymer, in the range of from about 0 to about 90 wt % NMP, in the range of from about 0 to about 90 wt % DMF, and in the range of from about 0 to about 90 wt % DMAC.

Suitable components of casting solutions are known in the art, which may be used as desired. Illustrative solutions comprising polymers, and illustrative solvents and nonsolvents include those disclosed in, for example, U.S. Pat. Nos. 4,629,563; 4,900,449; 4,964,990, 5,444,097; 5,846,422; 5,906,742; 5,928,774; 6,045,899; and 7,208,200.

For example, membrane samples can be prepared through a solution processes involving non-solvent-induced polymer precipitation, either by water vapor diffusion or direct quenching in water. Typically, a solution of the polymer, e.g., PES or PPESK, is prepared first with solvent DMAC or DMAC/NMP, pore former PEG400 and other additives. The solution is applied to a glass plate using a doctor blade with 10~15-mil space gap, evenly to form a film of polymer dope. The film is then either placed in a chamber with controlled temperature, air velocity and humidity, or directly immersed into a water bath with a preset temperature, allowing some time for the dope to transform into a solid film. The resulting solid film sample is leached in 50~70% ethanol/water, hot water at a temperature range from 50° C. to 80° C. and then dried in oven at a temperature range from 50-70° C. to afford a sheet of porous polymer membrane.

As an example, a typical formulation consists of PPESK polymer resin at about 15~25 wt %, solvent (NMP/DMAC) of about 200~300 phr, wetting polymer agents at a typical range of 5~25 phr, up to 50 phr. Pore former PEG400 is introduced at a concentration ranging from 50 phr to 100 phr. Other additives at a low percentage 0.5~3.0% can be used as needed for each individual formulation.

The casting solution is cast as a flat sheet on a glass plate or on a moving substrate such as a moving belt. Alternatively, the casting solution is cast as a hollow fiber.

Phase inversion can be effected by any known method. Phase inversion can include evaporation of the solvent and nonsolvent (dry process); exposure to a nonsolvent vapor, such as water vapor, which absorbs on the exposed surface (vapor phase-induced precipitation process); quenching in a nonsolvent liquid, generally water (wet process); or thermally quenching a hot film so that the solubility of the polymer is suddenly greatly reduced (thermal process).

In an embodiment, phase inversion is effected by exposing the cast solution to a non-solvent vapor, for example, an atmosphere of controlled humidity, following which the cast solution is immersed in a nonsolvent bath such as water bath.

Alternatively, a hydrophobic membrane can be coated with a hydrophilic block polymer. Thus, for example, a solution of the block copolymer is coated on a porous membrane formed from an aromatic hydrophobic polymer, or a porous membrane dipped in a solution of the block copolymer, and optionally, heated, to obtain a hydrophilic modified porous membrane.

Figure 2:
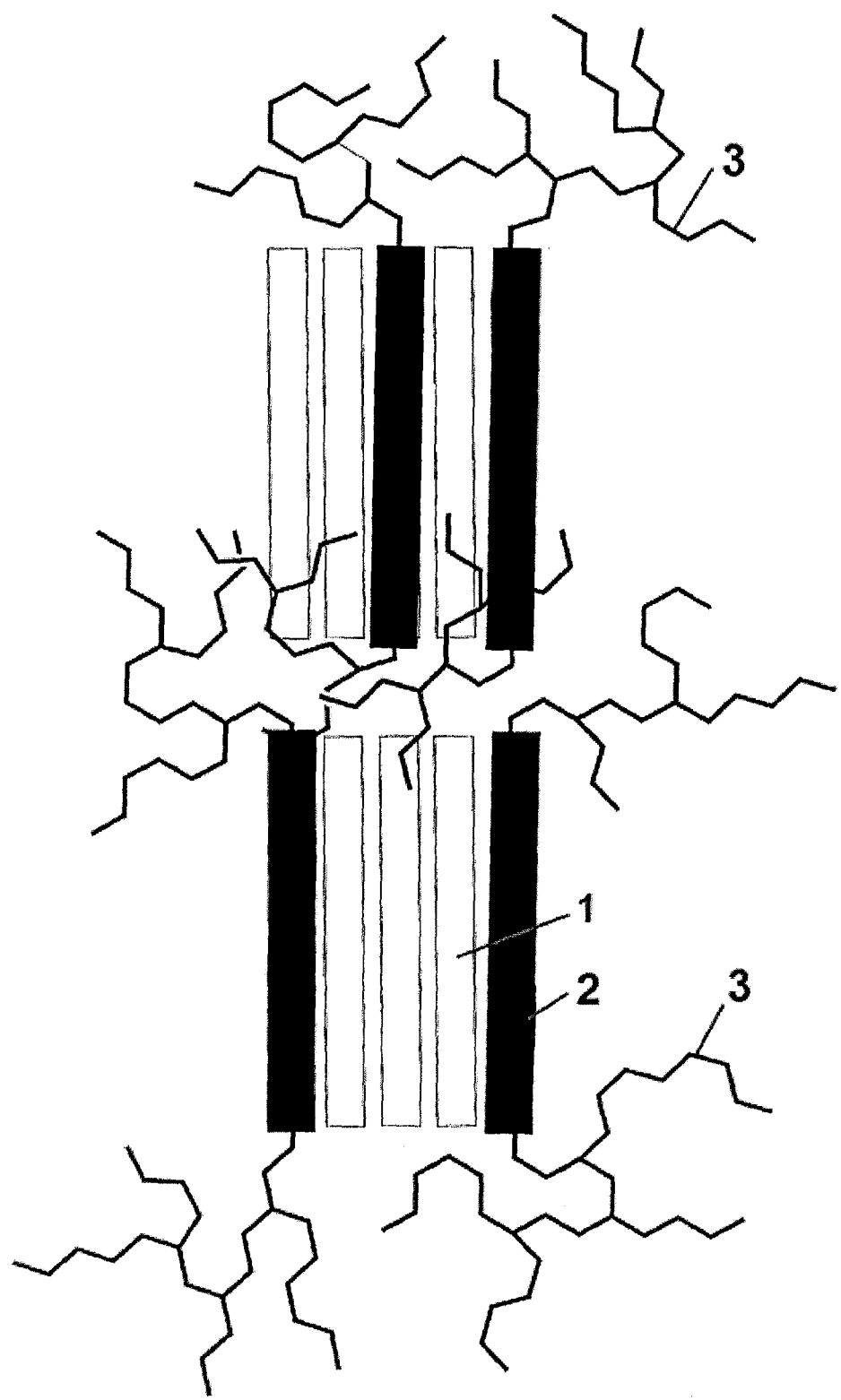
FIG. 2 depicts a diagram illustrating the microstructure of a hydrophilic porous membrane. 1 represents an aromatic hydrophobic polymer, 2 represents the aromatic hydrophobic polymeric segment of the block copolymer in accordance with an embodiment of the invention, and 3 represents the hydrophilic segment of the block copolymer.

As illustrated in FIG. 2, the microstructure of the porous membrane in accordance with an embodiment of the invention includes the hydrophilic segments 3 on the pore surfaces of the membrane, thereby improving the hydrophilicity of the membrane. The hydrophobic polymeric segment, 2, of the block copolymer orients itself with the aromatic hydrophobic polymer 1.

Porous membranes according to embodiments of the invention find use in microfiltration, ultrafiltration, nanofiltration, reverse osmosis, gas separation, pervaporation or vapor permeation, dialysis, membrane distillation, chromatography membranes, and/or forward osmosis and pressure retarded osmosis.

Porous membranes according to embodiments of the invention have a pore size of about 0.05 μm to about 10 μm and find use as microfiltration membranes. Porous membranes according to certain embodiments of the invention have a pore size of about 1 nm to about 0.5 μm and find use as nanofiltration membranes.

Porous membranes according to embodiments of the invention have a critical wetting surface tension (CWST) of about 70 to about 90 dynes/cm or more, for example, 72, 74, 76, 78, 80, 82, 84, or 86 dynes/cm.

Porous membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the porous membrane can have a variety of configurations, including planar, flat sheet, pleated, tubular, spiral, and hollow fiber.

Porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The following examples further illustrate the invention but, of course, should not be construed as in any way limiting its scope.

Example 1

This example illustrates a method of preparing a block copolymer in accordance with an embodiment of the invention.

100 g of BASF E6020 grade polyethersulfone was dissolved in DMAc (250 mL) at 100° C. in a 500 mL flask. Complete dissolution was achieved in 2 hours under vigorous agitation. Potassium carbonate (2 g) was added to the mixture and the reaction mixture was mixed for 30 minutes followed by the addition of glycidol (70 mL). The reaction mixture was maintained at 100° C. with constant agitation for 8 hours. The reaction mixture was quenched by the addition of acetic acid (20 mL) and allowed to cool down to room temperature. The product was precipitated by a slow addition of the reaction mixture to 1.5 L of IPA: water (90:10 v/v). The precipitate obtained was filtered via a fritted Buchner filter, washed with water (500 mL) and IPA (250 mL). The resulting white solid powder was then dried to yield 140 g of the desired product with 40 mol % of PES and 60 mol % of glycidyl as determined by proton NMR.

Example 2

This example illustrates a method of preparing another block copolymer in accordance with an embodiment of the invention.

100 g of Sumitomo 5003PS grade polyethersulfone was dissolved in DMAc (250 mL) at 100° C. in a 500 mL flask. Complete dissolution was achieved in 2 hours under vigorous agitation. Potassium carbonate (2 g) was added to the mixture and the reaction mixture was mixed for 30 minutes followed by the addition of glycidol (100 mL). The reaction mixture was maintained at 100° C. with constant agitation for 5 hours. The reaction mixture was quenched by the addition of acetic acid (20 mL) and allowed to cool down to room temperature.

The product was precipitated by a slow addition of the reaction mixture to 1.5 L of IPA: water (90:10 v/v). The precipitate obtained was filtered via a fitted Buchner filter, washed with water (500 mL) and IPA (250 mL). The resulting white solid was dried to yield 130 g of the desired product with 40 mol % of PES and 60 mol % of glycidyl as determined by proton NMR.

Example 3

This example illustrates a method of preparing yet another block copolymer in accordance with an embodiment of the invention.

100 g of Solvay VIRANTAGE VW-10200 RP grade polyethersulfone with a molecular weight of $45K_D$ was dissolved in DMAc (230 mL) at 100° C. in a 500 mL flask. Potassium carbonate (1.5 g) was added and the reaction mixture was mixed for 30 minutes followed by the addition of glycidol (20 mL). The reaction mixture was maintained at 100° C. under constant agitation for 8 hours. The reaction mixture was quenched by the addition of acetic acid (4 mL) and allowed to cool down to room temperature. The product was precipitated by a slow addition of the reaction mixture to 1.5 L of DI water. The precipitate obtained was filtered via a fitted Buchner filter and washed with water (500 mL) and IPA (250 mL). The resulting solid was dried to yield 105 g of the desired product with 90 mol % of PES and 10 mol % of glycidyl as determined by proton NMR.

Example 4

This example illustrates a method of preparing yet another block copolymer in accordance with an embodiment of the invention.

100 g of Solvay VIRANTAGE VW-10700 RP grade polyethersulfone with a molecular weight of $22K_D$ was dissolved in DMAc (230 mL) at 100° C. in a 500 mL flask. Potassium carbonate (2 g) was added and the reaction mixture was mixed for 30 minutes followed by the addition of glycidol (15 mL). The reaction mixture was maintained at 100° C. under constant agitation for 8 hours. The reaction mixture was quenched by the addition of acetic acid (4 mL) and allowed to cool down to room temperature. The product was precipitated by a slow addition of the reaction mixture to 1.5 L of DI water. The precipitate obtained was filtered via a fitted Buchner filter and washed with IPA (500 mL). The resulting solid was dried to yield 107 g of the desired product with 90 mol % of PES and 10 mol % of glycidyl as determined by proton NMR.

Example 5

This example illustrates a method of preparing yet another block copolymer in accordance with an embodiment of the invention.

100 g of Solvay VIRANTAGE VW-10700 RP grade polyethersulfone with a molecular weight of $22K_D$ was dissolved in DMAc (230 mL) at 100° C. in a 500 mL flask. Potassium carbonate (2 g) was added and the reaction mixture was mixed for 30 minutes followed by the addition of glycidol (25 mL). The reaction mixture was maintained at 100° C. under constant agitation for 8 hours. The reaction mixture was quenched by the addition of acetic acid (5 mL) and allowed to cool down to room temperature. The product was precipitated by a slow addition of the reaction mixture to 1.5 L of DI water. The precipitate obtained was filtered via a fitted Buchner filter and washed with IPA (500 mL). The resulting solid was dried to yield 107 g of the desired product with 85 mol % of PES and 15 mol % of glycidyl as determined by proton NMR.

Example 6

This example illustrates a method of preparing yet another block copolymer in accordance with an embodiment of the invention.

100 g of Solvay VIRANTAGE VW-10700 RP grade polyethersulfone with a molecular weight of $22K_D$ was dissolved in DMAc (230 mL) at 100° C. in a 500 mL flask. Potassium carbonate (2 g) was added and the reaction mixture was mixed for 30 minutes followed by the addition of glycidol (35 mL). The reaction mixture was maintained at 100° C. under constant agitation for 5 hours. The reaction mixture was quenched by the addition of acetic acid (5 mL) and allowed to cool down to room temperature. The resulting product was then precipitated by a slow addition of the reaction mixture to 1.5 L of DI water. The precipitate obtained was filtered via a fitted Buchner filter and washed with IPA (500 mL). The resulting solid was dried to yield 110 g of the desired product with 80 mol % of PES and 20 mol % of glycidyl as determined by proton NMR.

Example 7

This example illustrates a method of preparing yet another block copolymer in accordance with an embodiment of the invention.

100 g of Solvay VIRANTAGE VW-10700 RP grade polyethersulfone with a molecular weight of $22K_D$ was dissolved in DMAc (230 mL) at 100° C. in a 500 mL flask. Potassium carbonate (2 g) was added and the reaction mixture was mixed for 30 minutes followed by the addition of glycidol (50 mL). The reaction mixture was maintained at 100° C. under constant agitation for 8 hours. The reaction mixture was quenched by the addition of acetic acid (8 mL) and allowed to cool down to room temperature. The product obtained was precipitated by a slow addition of the reaction mixture to 1.5 L of DI water. The precipitate obtained was filtered via a fitted Buchner filter and washed with IPA (500 mL). The resulting solid was dried to yield 110 g of the desired product with 67 mol % of PES and 33 mol % of glycidyl as determined by proton NMR.

Example 8

This example illustrates a method of preparing yet another block copolymer in accordance with an embodiment of the invention.

100 g of Solvay VIRANTAGE VW-10700 RP grade polyethersulfone with a molecular weight of $22K_D$ was dissolved in DMAc (230 mL) at 100° C. in a 500 mL flask. Potassium carbonate (2 g) was added and the reaction mixture was mixed for 30 minutes followed by the addition of glycidol (60 mL). The reaction mixture was maintained at 100° C. under constant agitation for 8 hours. The reaction was quenched by the addition of acetic acid (10 mL) and allowed to cool down to room temperature. The product obtained was precipitated by a slow addition of the reaction mixture to 1.5 L of DI water: IPA (80:20 v/v). The precipitate obtained was filtered via a fitted Buchner filter, and washed with DI water (250 mL) and IPA (500 mL). The resulting solid was dried to obtain 110 g of the desired product with 53 mol % of PES and 47 mol % of glycidyl as determined by proton NMR.

Example 9

This example illustrates a method of preparing yet another block copolymer in accordance with an embodiment of the invention.

100 g of Solvay VIRANTAGE VW-10700 RP grade polyethersulfone with a molecular weight of $22K_D$ was dissolved in DMAc (230 mL) at 100° C. in a 500 mL flask. Potassium carbonate (2 g) was added and the reaction mixture was mixed for 30 minutes followed by the addition of glycidol (80 mL). The reaction mixture was maintained at 100° C. under constant agitation for 8 hours. The reaction mixture was quenched by the addition of acetic acid (10 mL) and allowed to cool down to room temperature. The resulting product was precipitated by a slow addition of the reaction mixture to 1.5 L of DI water: IPA (80:20, v/v). The precipitate obtained was filtered via a fritted Buchner filter and washed with DI water (500 mL) and IPA (500 mL). The resulting solid was dried to obtain 120 g of the desired product with 35 mol % of PES and 65 mol % of glycidyl as determined by proton NMR.

Example 10

This example illustrates a method of preparing a block copolymer which is partially soluble in water.

100 g of Solvay VIRANTAGE VW-10700 RP grade polyethersulfone with a molecular weight of $22K_D$ was dissolved in DMAc (230 mL) at 100° C. in a 500 mL flask. Potassium carbonate (2 g) was added and the reaction mixture was mixed for 30 minutes followed by the addition of glycidol (100 mL). The reaction mixture was maintained at 100° C. under constant agitation for 8 hours. The reaction mixture was quenched by the addition of acetic acid (20 mL) and allowed to cool down to room temperature. The resulting product was precipitated by a slow addition of the reaction mixture to 1.5 L of IPA. The precipitate obtained was then filtered via a fritted Buchner filter and washed with DI water (500 mL) and IPA (500 mL). The resulting solid was dried to obtain 110 g of the desired product with 25 mol % of PES and 75 mol % of glycidyl as determined by proton NMR.

Example 11

This example illustrates a method of preparing a block copolymer which is soluble in water.

100 g of Solvay VIRANTAGE VW-10700 RP grade polyethersulfone with a molecular weight of $22K_D$ was dissolved in DMAc (230 mL) at 100° C. in a 500 mL flask. Potassium carbonate (2 g) was added and the reaction mixture was mixed for 30 minutes followed by the addition of glycidol (150 mL). The reaction mixture was maintained at 100° C. under constant agitation for 8 hours. The reaction mixture was quenched by the addition of acetic acid (20 mL) and allowed to cool down to room temperature. The resulting product was precipitated by a slow addition of the reaction mixture to 1.5 L of IPA. The precipitate obtained was filtered via a fritted Buchner filter and washed with DI water (500 mL) and IPA (500 mL). The resulting solid was dried to obtain 130 g of the desired product with 10 mol % of PES and 90 mol % of glycidyl as determined by proton NMR.

Example 12

This example illustrates a method of preparing yet another block copolymer in accordance with an embodiment of the invention.

100 g of Solvay VIRANTAGE VW-10200 RP grade polyethersulfone with a molecular weight of $45K_D$ was dissolved in DMAc (230 mL) at 100° C. in a 500 mL flask. Potassium carbonate (1.5 g) was added and the reaction mixture was mixed for 30 minutes followed by the addition of glycidol (40 mL). The reaction mixture was maintained at 100° C. under constant agitation for 8 hours. The reaction mixture was quenched by the addition of acetic acid (4 mL) and allowed to cool down to room temperature. The resulting product was precipitated by a slow addition of the reaction mixture to 1.5 L of DI water. The precipitate obtained was filtered via a fritted Buchner filter, and washed with water (500 mL) and IPA (250 mL). The resulting solid was dried to yield 105 g of the desired product with 85 mol % of PES and 15 mol % of glycidyl as determined by proton NMR.

Example 13

This example illustrates a method of preparing yet another block copolymer in accordance with an embodiment of the invention.

100 g of Solvay VIRANTAGE VW-10200 RP grade polyethersulfone with a molecular weight of $45K_D$ was dissolved in DMAc (230 mL) at 100° C. in a 500 mL flask. Potassium carbonate (1.5 g) was added and the reaction mixture was mixed for 30 minutes followed by the addition of glycidol (50 mL). The reaction mixture was maintained at 100° C. under constant agitation for 8 hours. The reaction mixture was quenched by the addition of acetic acid (6 mL) and allowed to cool down to room temperature. The resulting product was precipitated by a slow addition of the reaction mixture to 1.5 L of DI water. The precipitate obtained was filtered via a fritted Buchner filter, and washed with water (500 mL) and IPA (250 mL). The resulting solid was dried to obtain 105 g of the desired product with 80 mol % of PES and 20 mol % of glycidyl as determined by proton NMR.

Example 14

This example illustrates a method of preparing yet another block copolymer in accordance with an embodiment of the invention.

100 g of Solvay VIRANTAGE VW-10200 RP grade polyethersulfone with a molecular weight of $45K_D$ was dissolved in DMAc (230 mL) at 100° C. in a 500 mL flask. Potassium carbonate (1.5 g) was added and the reaction mixture was mixed for 30 minutes followed by the addition of glycidol (60 mL). The reaction mixture was maintained at 100° C. under constant agitation for 8 hours. The reaction mixture was then quenched by the addition of acetic acid (8 mL) and allowed to cool down to room temperature. The resulting product was precipitated by slow addition of the reaction mixture to 1.5 L of DI water. The precipitate obtained was filtered via a fitted Buchner filter, and washed with water (500 mL) and IPA (250 mL). The resulting solid was dried to obtain 110 g of the desired product with 70 mol % of PES and 30 mol % of glycidyl as determined by proton NMR.

Example 15

This example illustrates a method of preparing yet another block copolymer in accordance with an embodiment of the invention.

100 g of Solvay VIRANTAGE VW-10200 RP grade polyethersulfone with a molecular weight of $45K_D$ was dissolved in DMAc (230 mL) at 100° C. in a 500 mL flask. Potassium carbonate (1.5 g) was added and the reaction mixture was mixed for 30 minutes followed by the addition of glycidol (70 mL). The reaction mixture was maintained at 100° C. under constant agitation for 8 hours. The reaction mixture was then quenched by the addition of acetic acid (10 mL) and allowed to cool down to room temperature. The resulting product was precipitated by a slow addition of the reaction mixture to 1.5 L of DI water: IPA (80:20 v/v). The resulting precipitate was filtered via a fritted Buchner filter, and washed with water (500 mL) and IPA (250 mL). The resulting solid was dried to obtain 115 g of the desired product with 55 mol % of PES and 45 mol % of glycidyl as determined by proton NMR.

Example 16

This example illustrates a method of preparing yet another block copolymer in accordance with an embodiment of the invention.

100 g of Solvay VIRANTAGE VW-10200 RP grade polyethersulfone with a molecular weight of 45$K_D$ was dissolved in DMAc (230 mL) at 100° C. in a 500 mL flask. Potassium carbonate (1.5 g) was added and the reaction mixture was mixed for 30 minutes followed by the addition of glycidol (120 mL). The reaction mixture was maintained at 100° C. under constant agitation for 8 hours. The reaction mixture was quenched by the addition of acetic acid (10 mL) and allowed to cool down to room temperature. The resulting product was precipitated by a slow addition of the reaction mixture to 1.5 L of DI water: IPA (80:20 v/v). The precipitate obtained was filtered via a fritted Buchner filter and washed with water (500 mL) and IPA (250 mL). The resulting solid was dried to obtain 140 g of the desired product with 30 mol % of PES and 70 mol % of glycidyl as determined by proton NMR.

Example 17

This example illustrates a method of preparing a block copolymer which is partially soluble in water.

100 g of BASF E6020 grade polyethersulfone was dissolved in DMAc (230 mL) at 100° C. in a 500 mL flask. The complete dissolution was achieved in 2 hours under vigorous agitation. Potassium carbonate (2 g) was added to the mixture and the reaction mixture was mixed for 30 minutes followed by the addition of glycidol (110 mL). The reaction mixture was maintained at 100° C. and constant agitation for 8 hours. The reaction mixture was quenched by the addition of acetic acid (20 mL) and allowed to cool down to room temperature. The resulting product was precipitated by a slow addition of the reaction mixture to 1.5 L of IPA: water (90:10 v/v). The precipitate obtained was filtered via a fitted Buchner filter, and washed with water (500 mL) and IPA (250 mL). The resulting white solid powder was dried to obtain 150 g of the desired product with 20 mol % of PES and 80 mol % of glycidyl as determined by proton NMR.

Example 18

This example illustrates a method of preparing another block copolymer which is partially soluble in water.

100 g of BASF E7020 grade polyethersulfone was dissolved in DMAc (300 mL) at 100° C. in a 500 mL flask. Potassium carbonate (2 g) was added to the mixture and the reaction mixture was mixed for 30 minutes followed by the addition of glycidol (100 mL). The reaction mixture was maintained at 100° C. and constant agitation for 12 hours. The reaction mixture was quenched by the addition of acetic acid (20 mL) and allowed to cool down to room temperature. The resulting product was precipitated by a slow addition of the reaction mixture to 1.5 L of IPA: water (80:20 v/v). The precipitate obtained was filtered via fritted Buchner filter, and washed with water (500 mL) and IPA (250 mL). The resulting white solid powder was dried to obtain 150 g of the desired product with 30 mol % of PES and 70 mol % of glycidyl as determined by proton NMR.

Example 19

This example illustrates a method of preparing yet another block copolymer in accordance with an embodiment of the invention.

100 g of Sumitomo 5400P grade polyethersulfone was dissolved in DMAc (230 mL) at 100° C. in a 500 mL flask. Potassium carbonate (1.5 g) was added to the mixture and the reaction mixture was mixed for 30 minutes followed by the addition of glycidol (100 mL). The reaction mixture was maintained at 100° C. under constant agitation for 12 hours. The reaction mixture was quenched by the addition of acetic acid (20 mL) and allowed to cool down to room temperature. The resulting product was precipitated by a slow addition of the reaction mixture to 1.5 L of IPA: water (80:20 v/v). The precipitate obtained was filtered via a fitted Buchner filter, and washed with water (500 mL) and IPA (250 mL). The resulting white solid powder was dried to obtain 140 g of the desired product with 35 mol % of PES and 65 mol % of glycidyl as determined by proton NMR.

Example 20

This example illustrates some of the properties of the block copolymers in accordance with an embodiment of the invention.

TABLE 1

Properties of Block Copolymers

| PES MW | PES segment (mol % by NMR) | Pg segment (mol % by NMR) | Water Solubility |
|---|---|---|---|
| PES-22$K_D$ | 85 | 15 | No |
| PES-22$K_D$ | 80 | 20 | No (Hydrophilic) |
| PES-22$K_D$ | 70 | 33 | No (Hydrophilic) |
| PES-22$K_D$ | 53 | 47 | No (Hydrophilic) |
| PES-22$K_D$ | 25 | 75 | Yes |
| PES-45$K_D$ | 80 | 20 | No (Hydrophilic) |
| PES-45$K_D$ | 70 | 30 | No (Hydrophilic) |
| PES-45$K_D$ | 55 | 45 | No (Hydrophilic) |
| PES-45$K_D$ | 48 | 52 | No (Hydrophilic) |

Example 21

This example illustrates the preparation of porous membranes in accordance with an embodiment of the invention.

Block copolymers (PES-Pg) prepared in Examples 1 and 2 were employed as wetting agents in preparing porous PES membranes. The wetting agent was employed at 6.9 phr of the PES. The compositions of the membrane casting solutions are set forth in Table 2 below along with that of the control membrane where PVP K-90 was employed as the wetting agent. The casting solutions were clear as indicated in the Comment.

TABLE 2

PES Membrane Formulations Prepared Using PES-Pg from Examples 1 and 2

| | Control % | PES-Pg % | PES-Pg % | PES-Pg % | PES-Pg % |
|---|---|---|---|---|---|
| PEG | 64.5 | 64.5 | 63.6 | 64.9 | 64.5 |
| H$_2$O | 3.0 | 3.0 | 3.0 | 3.0 | 3.0 |
| DMF | 10.0 | 10.0 | 10.0 | 10.0 | 10.0 |
| NMP | 7.6 | 7.6 | 7.6 | 7.6 | 7.6 |
| PES | 13.0 | 13.0 | 13.0 | 13.0 | 13.0 |
| Glycerin | 1.0 | 1.0 | 1.0 | 1.0 | 1.0 |
| Wetting Agent | 0.9 | 0.9 | 1.80 | 0.45 | 0.9 |
| | PVP K90 | Example 1 | Example 1 | Example 1 | Example 2 |
| Comment | Clear Mix | Clear Mix | Clear Mix | Clear Mix | Clear Mix |

The membrane casting solutions were cast using vapor-induced phase separation process, with a casting temperature of 43° C., relative humidity of 75%, and dry bulb of 25° C. No formulation defects were observed. Sumitomo PES was used.

Physical properties and CWSTs were measured on the dried membranes and are set forth in Table 3. Samples of the membrane were also tested for IPA extractables. 6 discs of 47 mm diameter were dried for 1 hour at 80° C. and Soxhlet extracted with IPA for 3 hours followed by a final 1 hour dry cycle at 80° C. The % extractables were calculated. The CWSTs were again measured after the IPA extraction and are set forth in Table 3.

TABLE 3

Physical Properties and CWST of Porous Membranes

| Sample (Mix ID) | 0.90% PVP K90 Control | 1.8% PES-Pg Example 1 | 0.90% PES-Pg Example 1 | 0.45% PES-Pg Example 1 | 0.9% PES-Pg Example 2 |
|---|---|---|---|---|---|
| Thick (mils) | 6.2 | 5.45 | 5.65 | 5.4 | 6.6 |
| Water Flow Rate (ml/min/cm$^2$) | 11.4 | 15.6 | 14.3 | 16.1 | 14.2 |
| Bubble Point (psi) | 82.33 | 80.44 | 79.51 | 76.18 | 64.86 |
| CWST (dynes/cm) | 87 | 90 | 86 | 77 | 87 |
| IPA Extractables (%) | 2.24 | 1.09 | 1.04 | 1.04 | 1.03 |

Example 22

This example illustrates the preparation of additional porous membranes in accordance with an embodiment of the invention.

Block copolymers (PES-Pg) prepared in Examples 2 and 7 were employed as wetting agents in preparing porous PES membranes. The wetting agent was employed at 6.9 phr of the PES. The compositions of the membrane casting solutions are set forth in Table 4 and the membrane casting conditions are set forth in Table 5.

TABLE 4

Compositions of Membrane Casting Solutions

| Components | Control % | Example 7 % | Example 7 % | Example 2 % | Example 2 % |
|---|---|---|---|---|---|
| PEG-400 | 66.40 | 66.40 | 64.40 | 66.40 | 64.40 |
| PES (Sumitomo) | 14.0 | 13.0 | 13.0 | 13.0 | 11.0 |
| Example 7 | — | 1.0 | 3.0 | — | — |
| Example 2 | — | — | — | 1.0 | 3.0 |
| RO Water | 2.0 | 2.0 | 2.0 | 2.0 | 2.0 |
| DMF | 11.0 | 11.0 | 11.0 | 11.0 | 11.0 |
| NMP | 6.6 | 6.6 | 6.6 | 6.6 | 6.6 |

TABLE 5

Membrane Casting Conditions

| Condition | Setting |
|---|---|
| Mix Temperature (° C.) | 38 |
| Casting Thickness (mils) | 12 |
| Casting Plate Temperature (° C.) | 43 |
| Chamber Plate Temperature (° C.) | 38 |
| Dry Bulb (° C.) | 25 |
| RH (%) | 75 |
| Air Velocity (fps) | 5.0 |
| Leach | ambient water/ethanol-water (1:1)/hot water (40° C.) |
| Dry (° C.) | 60 |

0.2 μm diameter porous membranes were produced and they did not contain any membrane defects, indicating compatibility of the copolymer with the base PES. Some of the properties of the membranes are set forth in Table 6. The block copolymer additive increased the CWST of the membranes of the invention compared to the control membrane. The block copolymer from Example 2 had a greater molecular weight than the one from Example 7, and resulted in a significant increase in the CWST. The membrane prepared with the block copolymer of Example 2 had a significantly high water flow rate.

TABLE 6

Properties of Porous Membranes

| Formulation | Water Bubble Point (water; psi) | Water Flow Rate (ml/min @ 0.7 bar: 10 psi) | Thickness (mils) | CWST (dynes/cm as cast) | CWST (dynes/cm; 145° C. Dry Heat for 2 hours) | CWST (dynes/cm; 145° C. Dry Heat for 3 hours + IPA ext) | Membrane Visual | Mixture Visual |
|---|---|---|---|---|---|---|---|---|
| Control | 50 | 23 | 4.8 | 70 | 69 | 69 | No Defects | clear |
| Ex. 7 | 51 | 31 | 5.0 | 76 | 76 | 76 | No Defects | clear |
| Ex. 7 | 52 | 29 | 4.6 | 79 | 76 | 76 | No Defects | clear |
| Ex. 2 | 43 | 51 | 5 | 90 | 86 | 87 | No Defects | clear |
| Ex. 2 | 53 | 46 | 5 | 90 | 86 | 87 | No Defects | clear |

Figure 1B:
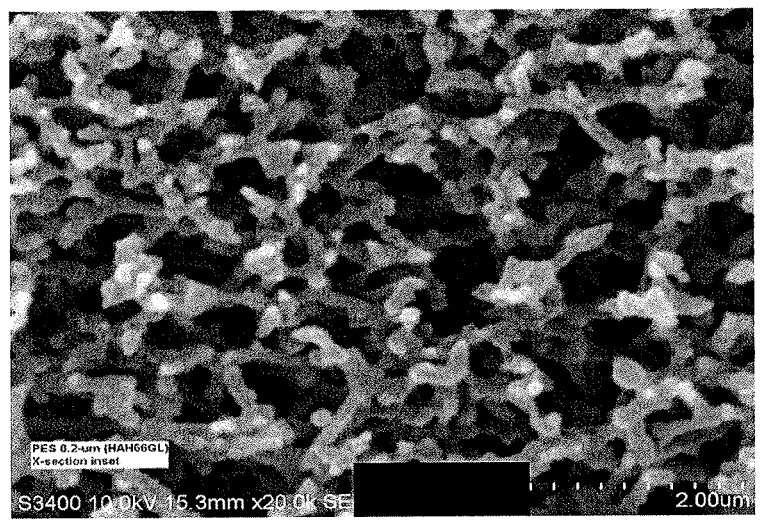
FIG. 1B depicts a higher magnification SEM of FIG. 1A.

SEM images of the membranes indicate that the PES-Pg membranes have a typical PES membrane porous structure, which is required for membrane flow, strength, and filter-life performance. FIG. 1A depicts the SEM of a cross-section of a membrane prepared from the block copolymer of Example 7 and FIG. 1B depicts a higher magnification SEM of FIG. 1A, showing that the membrane had a symmetric and highly interconnected pore structure.

Example 23

This example illustrates the pore sizes of porous membranes as a function of the amount of hydrophilic block copolymer employed in the preparation of porous membranes in accordance with an embodiment of the invention.

Casting solutions containing 12.1% polyethersulfone resin, 22.5% t-amyl alcohol, in NMP solution, and one of the following: 0.3%, 0.6%, 1%, or 2% hydrophilic block copolymer, were prepared. The solution was deposited onto a Mylar sheet or a textured substrate support as a thin film. Phase inversion was initiated based on the air gap. Air velocity was controlled over the gap by controlling the speed of the fan. Phase inversion was completed by immersing it in a nonsolvent bath, followed by rinse in RO water and oven drying. The results obtained are set forth below in Table 7 and show that very small concentrations of the hydrophilic block copolymer, e.g., at 0.3%, high CWST's are obtained. At 0.3% and 0.6% concentrations of the hydrophilic block copolymer, the pore size obtained was 10 nm.

TABLE 7

Membrane Casting Parameters and Properties of Membranes

| | Hydrophilic Block Copolymer, % by wt | Air Gap | Quench temp (° F.) | Casting speed (fpm) | Wet Water Flow (ml/min @ 10 psi for 90 mm disc) | Pore Size (nm) | CWST (dynes/cm) |
|---|---|---|---|---|---|---|---|
| Control PES media | 0 | 1 inch | 78 | 12 | 430 | 10 | ~55 |
| EXP 1 | 0.3 | 1 inch | 78 | 12 | 296 | 10 | >72 |
| EXP 2 | 0.6 | 1 inch | 78 | 12 | 290 | 10 | >76 |
| EXP 3 | 1 | 1 inch | 68 | 12 | 275 | <10 | >76 |
| EXP 4 | 2 | 1 inch | 68 | 12 | 250 | <10 | >76 |

Example 24

This example illustrates the preparation of porous membranes comprising a blend of PPESK and PES-Polyglycerol (PES-Pg) as wetting agent.

Figure 3A:
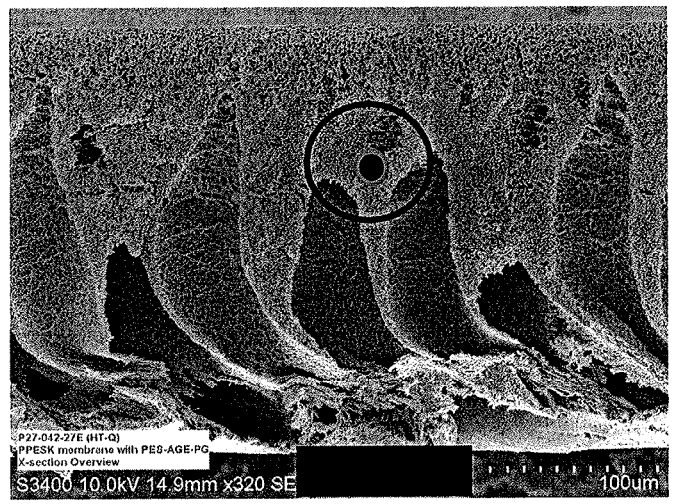
FIG. 3A depicts the SEM image of the cross-section of a membrane in accordance with an embodiment of the invention.
Figure 3B:
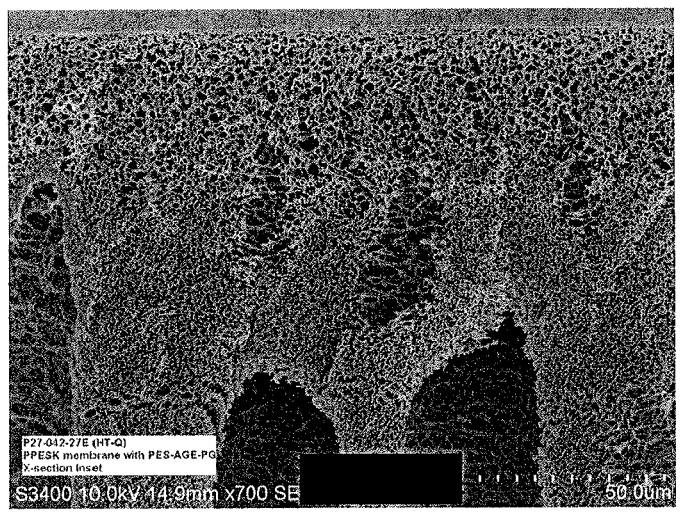
FIG. 3B depicts a higher magnification SEM image of the image depicted in FIG. 3A.

A casting solution containing a PPESK resin at 15 wt %, solvent NMP/DMAc (v/v) at 300 phr, the PES-Pg of Example 2 at 10 phr was prepared and cast as a 15 mil thick film at 28° C., air temperature 32° C., relative humidity 72%. Water bath temperature was set at 80° C. The dope was placed in an environmental chamber for 15 seconds and immersed in water at room temperature. The membrane had a CWST of 76 dynes/cm. The morphology of the membrane was characterized by SEM. FIG. 3A depicts the SEM image of the cross-section of a membrane in accordance with an embodiment of the invention. FIG. 3B depicts a higher magnification SEM image of the image depicted in FIG. 3A. The membrane an unsymmetrical pore structure distribution from side to side. The pores were in cellular forms with low interconnectivity.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A block copolymer of formula A-B-A (I) or A-B (II), comprising blocks A and B, wherein block A is a hydrophilic polymeric segment comprising polyglycerol and block B is an aromatic hydrophobic polymeric segment selected from polysulfone, polyethersulfone, polyphenylene ether, polyphenylene oxide, polycarbonate, poly(phthalazinone ether sulfone ketone), polyether ketone, polyether ether ketone, polyether ketone ketone, polyimide, polyetherimide, and polyamide-imide.

2. The block copolymer of claim 1, wherein the polyglycerol has one or more of the following repeat units:

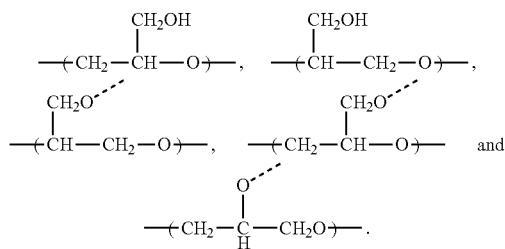

3. The block copolymer of claim 1, wherein block A comprises of one or more of the following structures:

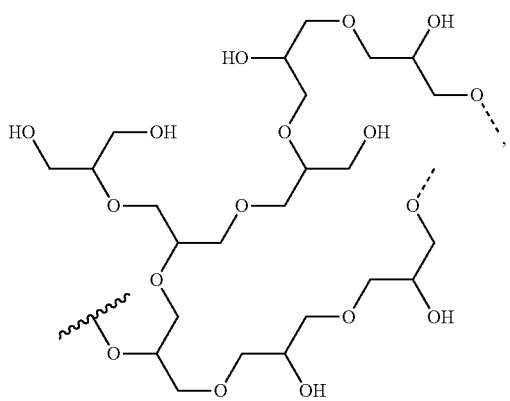

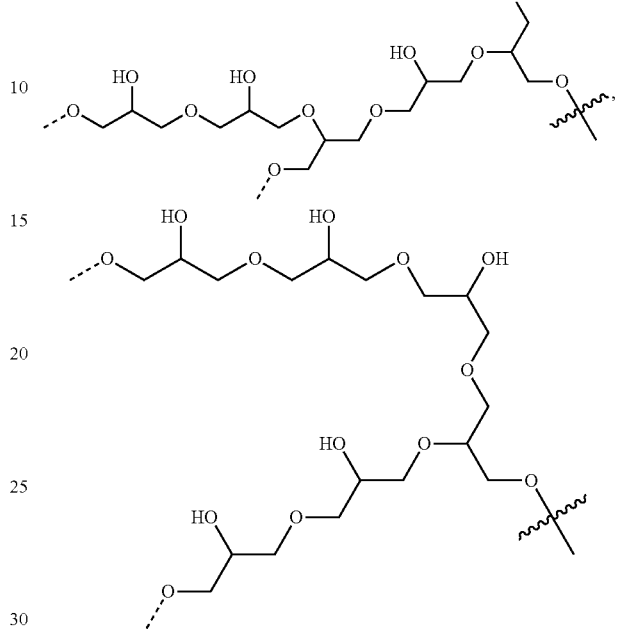

4. The block copolymer of claim 1, wherein the aromatic hydrophobic polymeric segment is polyethersulfone.

5. The block copolymer of claim 4, which has the following structure:

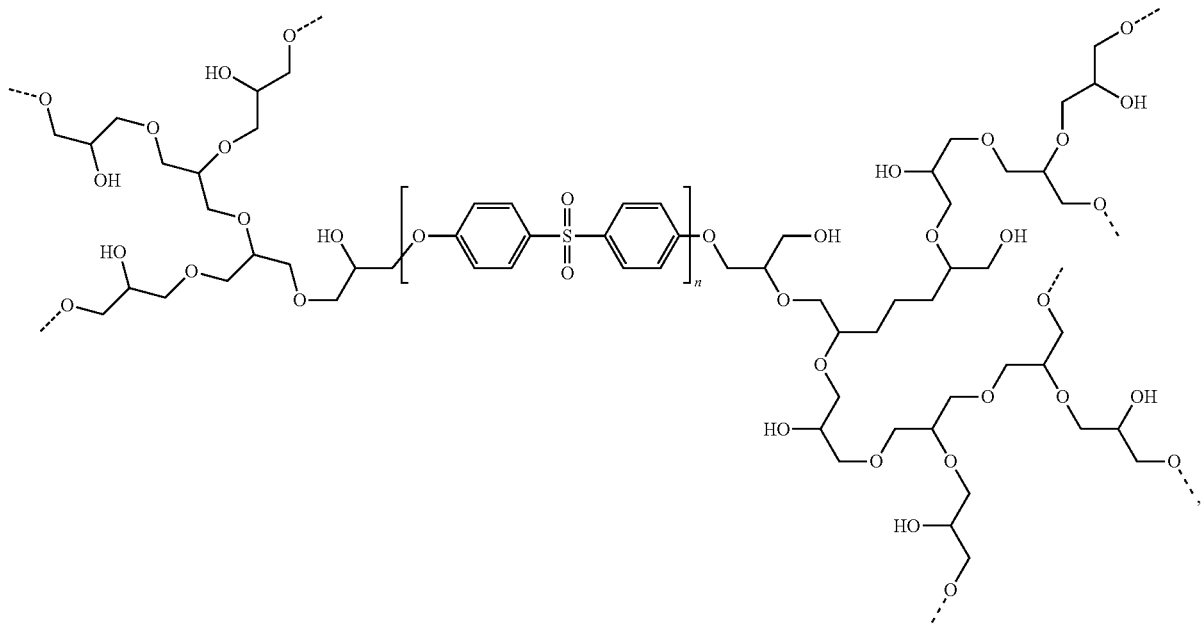

wherein n is about 10 to about 1000.

6. The block copolymer of claim 1, wherein block A is present in an amount of about 20% to about 60 mol % and block B is present in an amount of about 30% to about 80 mol %.

7. The block copolymer of claim 6, wherein block A is present in an amount of about 40% to about 55 mol % and block B is present in an amount of about 40% to about 60 mol %.

8. A method of preparing a block copolymer of claim 1, comprising:
(i) providing an aromatic hydrophobic polymeric segment having one or more terminal functional groups selected from hydroxy, mercapto, and amino groups; and
(ii) carrying out ring opening polymerization of glycidol on the aromatic hydrophobic polymeric segment.

9. The method of claim 8, wherein the aromatic hydrophobic polymeric segment has one or more terminal hydroxy groups.

10. The method of claim 8, wherein the aromatic hydrophobic polymeric segment has the formula:

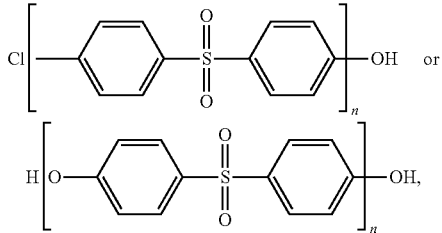

wherein n is about 10 to about 1000.

11. The method of claim 8, wherein the ring opening polymerization is carried out in the presence of a base.

12. The method of claim 11, wherein the base is selected from potassium carbonate, sodium carbonate, cesium carbonate, sodium tertiary butoxide, potassium tertiary butoxide, tetramethylammonium hydroxide, ammonium hydroxide, tetrabutylammonium hydroxide, sodium hydroxide, potassium hydroxide, lithium hydroxide, barium carbonate, barium hydroxide, cesium hydroxide, lithium carbonate, magnesium carbonate, magnesium hydroxide, sodium amide, and lithium amide, and combinations thereof.

13. The method of claim 8, wherein the ring opening polymerization of glycidol is carried out in a solvent selected from N,N-dimethylacetamide, N,N-dimethylformamide, dimethyl sulfoxide, and N-methylpyrrolidone, and mixtures thereof.

14. The method of claim 8, wherein the molar ratio of the aromatic hydrophobic polymeric segment to that of glycidol is about 1:0.1 to about 1:1.1.

15. The method of claim 8, wherein the molar ratio of the aromatic hydrophobic polymeric segment to that of glycidol is about 1:0.7 to about 1:0.9.

16. A porous membrane comprising an aromatic hydrophobic polymer and a block copolymer of claim 1.

17. A method of preparing a porous membrane comprising an aromatic hydrophobic polymer and a block copolymer of claim 1, said method comprising:
(i) providing a polymer solution comprising a solvent, said aromatic hydrophobic polymer, and said block copolymer;
(ii) casting the polymer solution as a thin film;
(iii) subjecting the thin film to phase inversion to obtain a porous membrane; and optionally
(iv) washing the porous membrane.

18. A porous membrane comprising an aromatic hydrophobic polymer and a block copolymer of the formula A-B-A (I) or A-B (II), comprising blocks A and B, wherein block A is a hydrophilic polymeric segment comprising polyglycerol and block B is an aromatic hydrophobic polymeric segment.

19. The porous membrane of claim 18, wherein the polyglycerol has one or more of the following repeat units:

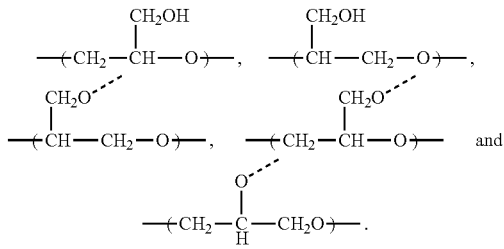

20. The porous membrane of claim 18, wherein the copolymer has the following structure:

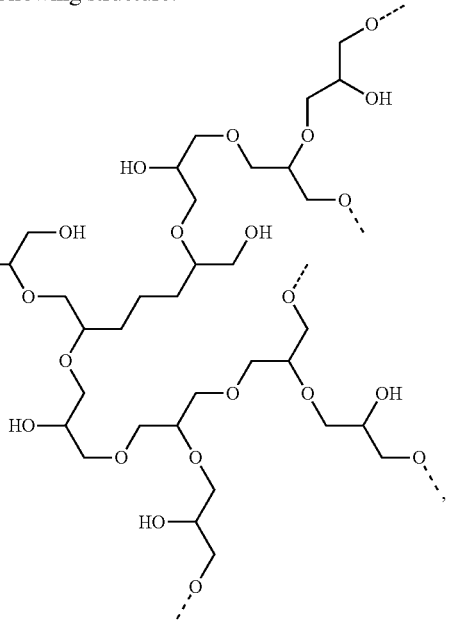

wherein n is about 10 to about 1000.

* * * * *